US012784482B2

(12) United States Patent
Tsujimoto

(10) Patent No.: US 12,784,482 B2
(45) Date of Patent: Nov. 3, 2026

(54) IMAGE PROCESSING APPARATUS, IMAGE FORMING APPARATUS, AND IMAGE PROCESSING METHOD

(71) Applicant: SHARP KABUSHIKI KAISHA, Sakai City (JP)

(72) Inventor: Sho Tsujimoto, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 231 days.

(21) Appl. No.: 18/504,277

(22) Filed: Nov. 8, 2023

(65) Prior Publication Data

US 2024/0193971 A1 Jun. 13, 2024

(30) Foreign Application Priority Data

Dec. 9, 2022 (JP) ................................ 2022-197309

(51) Int. Cl.
*G06V 30/10* (2022.01)

(52) U.S. Cl.
CPC .................................. *G06V 30/10* (2022.01)

(58) Field of Classification Search
CPC .................................................... G06V 30/10
See application file for complete search history.

(56) References Cited

U.S. PATENT DOCUMENTS

| | | | | |
|---|---|---|---|---|
| 7,826,665 B2 * | 11/2010 | Bressan | G06V 30/12 | 382/187 |
| 9,021,391 B2 * | 4/2015 | Kong | H04N 1/0097 | 715/810 |
| 10,863,040 B2 * | 12/2020 | Naito | H04N 1/4406 | |
| 11,252,287 B2 * | 2/2022 | Soga | H04N 1/00411 | |
| 12,483,588 B2 * | 11/2025 | Bums | H04L 63/1425 | |
| 2016/0147386 A1 * | 5/2016 | Han | H04N 1/00411 | 715/838 |
| 2022/0159129 A1 | 5/2022 | Abe et al. | | |

FOREIGN PATENT DOCUMENTS

| | | |
|---|---|---|
| JP | 2000-155802 A | 6/2000 |
| JP | 2003-115029 A | 4/2003 |
| JP | 2015-014854 A | 1/2015 |
| JP | 2016-126796 A | 7/2016 |
| JP | 2022-079352 A | 5/2022 |

* cited by examiner

*Primary Examiner* — Edward Park
(74) *Attorney, Agent, or Firm* — ScienBiziP, P.C.

(57) ABSTRACT

An image processing apparatus including: an image data receiver that receives image data; an optical character reader (OCR) processor that performs OCR processing with respect to the image data; a display that displays various data to a user; an operation acceptor that receives a command from the user; and a controller that displays the image data receiver, the OCR processor, the display, and the operation acceptor. When the image data receiver receives image data and the operation acceptor receives a command to extract predetermined information from the image data, the controller causes the OCR processor to perform the OCR processing with respect to the image data to extract the information, and causes the display to display the information extracted by the OCR processing.

9 Claims, 10 Drawing Sheets

FAX RECEPTION SYSTEM 100

| RECORD ID | TRANSACTION DATE | TRANSACTION AMOUNT | TRANSACTION PARTNER | IMAGE DATA OR IMAGE PATH |
|---|---|---|---|---|
| 1 | YYYY/MM/DD | 10,000 | ABCDE CORPORATION |  or ¥¥xxx.jpg |
| | | | | |
| | | | | |

IMAGE PROCESSING APPARATUS, IMAGE FORMING APPARATUS, AND IMAGE PROCESSING METHOD

BACKGROUND OF THE INVENTION

Field of the Invention

The present disclosure relates to an image processing apparatus, an image forming apparatus, and an image processing method, and more specifically to an image processing apparatus, an image forming apparatus, and an image processing method having a facsimile (fax) communication function.

Description of the Background Art

When a conventional image processing apparatus having a fax communication function receives fax data on a receipt or the like, a user registers, together with a printed fax image, transaction information in the fax image in a database.

In this case, the user performs optical character reader (OCR) processing with respect to image data obtained by scanning the printed fax image, and inputs the transaction information including a transaction partner name to register the transaction information in the database.

However, the conventional method requires scanning of a printed fax image, and OCR processing performed with respect to image data obtained by scanning the printed fax image may cause OCR erroneous recognition, thus requiring the user to carefully check whether the result of OCR recognition is correct.

Therefore, the registration of a fax image in the database places a significant burden on the user.

In order to reduce the burden of checking the result of OCR recognition, a conventionally known OCR input data screen corrector reads a ledger sheet to obtain data and displays the obtained data so that the data conforms to a check performed by a system that uses the data, allowing a check of whether the data is correctly read and a check conforming to the system to be performed on the same display screen.

Furthermore, a known accounting processing system includes a processor including an item processor and a journal processor to minimize erroneous journal input and to efficiently determine account items that match the business of each client. The item processor extracts a remark string matching a keyword string from remark information included in transaction information, and uses the remark string as a key to extract one or more account item candidates obtained by searching remark dictionary data. The journal processor generates journal data by combining, with the transaction information, an account item determined by an operator among the account item candidates.

However, the conventional method requires the user to scan an image and perform OCR processing with respect to image data obtained by scanning the image, and does not allow an appropriate correction intended by the user when OCR erroneous recognition occurs.

The present disclosure has been made in view of the above circumstances, and provides an image processing apparatus, an image forming apparatus, and an image processing method that allow an easier check and correction of information in image data than the conventional method.

SUMMARY OF THE INVENTION

An image processing apparatus according to the present disclosure includes: an image data receiver that receives image data; an optical character reader (OCR) processor that performs OCR processing with respect to the image data; a display that displays various data to a user; an operation acceptor that receives a command from the user; and a controller that displays the image data receiver, the OCR processor, the display, and the operation acceptor, wherein when the image data receiver receives image data and the operation acceptor receives a command to extract predetermined information from the image data, the controller causes the OCR processor to perform the OCR processing with respect to the image data to extract the information, and causes the display to display the information extracted by the OCR processing.

An image forming apparatus according to the present disclosure includes: the image processing apparatus; and an image former that forms an image based on image data, wherein when the operation acceptor receives a command to form an image based on the image data without extracting the information from the image data, the controller causes the image former to form an image based on the image data.

An image processing method according to the present disclosure, wherein when image data is received and a command to extract predetermined information from the image data is received, OCR processing is performed with respect to the image data to extract the information, and the information extracted by the OCR processing is displayed.

According to the present disclosure, information extracted by performing OCR processing with respect to received image data is displayed, thus achieving an image processing apparatus, an image forming apparatus, and an image processing method that allow an easier check and correction of information in image data than the conventional method.

BRIEF DESCRIPTION OF THE DRAWINGS

FIG. 6A shows a registration screen for transaction information, and FIG. 6B shows a preview screen of received fax image data.

DESCRIPTION OF THE PREFERRED EMBODIMENTS

Figure 1:
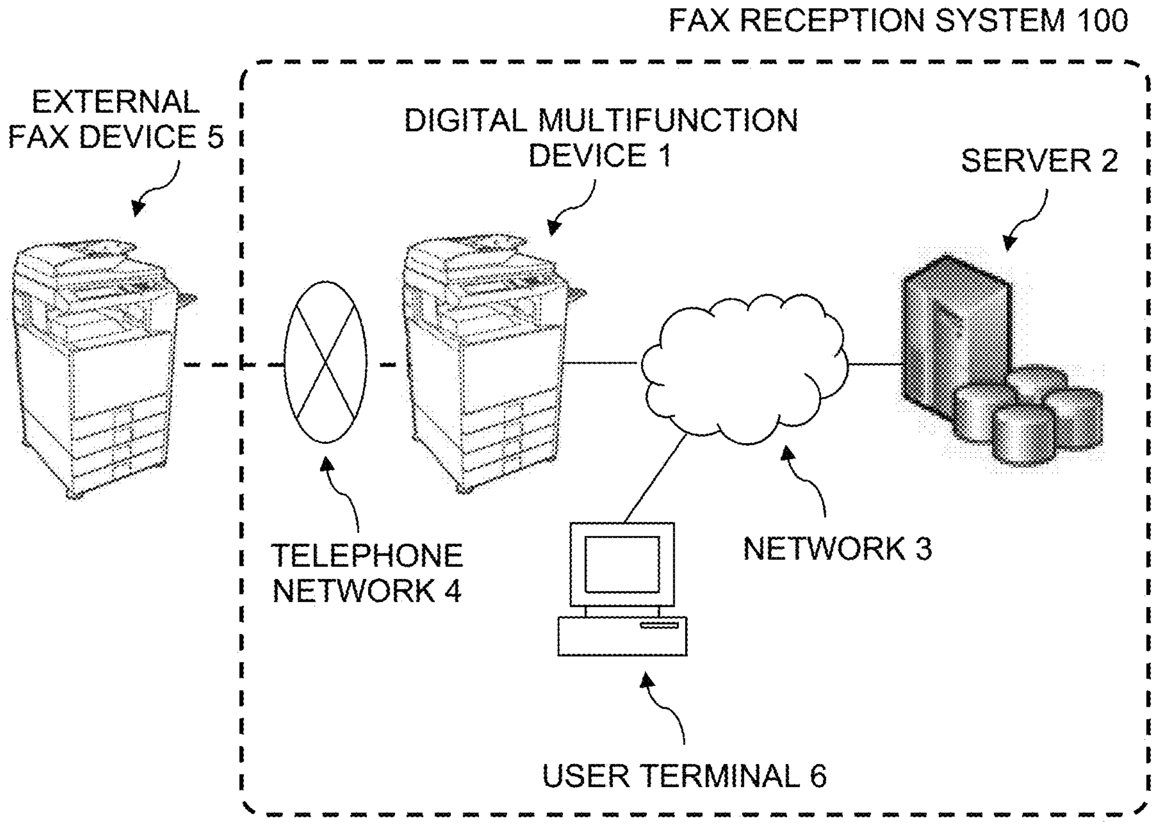
FIG. 1 is an explanatory diagram showing an example of a configuration of a fax reception system including a digital multifunction device of the present disclosure.

In the present disclosure, an "image processing apparatus" is, for example, a facsimile apparatus that transmits and receives fax documents, or an apparatus that transmits and receives e-mails.

An "image forming apparatus" is an apparatus that forms an image and outputs the image, and is, for example, a copier or a multifunction device having a copy function such as a printer that uses an electrophotographic method to form an image using a toner, or a multifunctional peripheral (MFP) having the copy function and other functions.

Furthermore, preferred embodiments of the present disclosure will be described.

The image processing apparatus of the present disclosure may further include a storage that stores a database of a transmission destination to which the image data is transmitted, and may be configured such that in a case where the operation acceptor receives a command to extract the information from the image data, the controller verifies the information extracted by causing the OCR processor to perform the OCR processing with respect to the image data against registration information registered in the database via a communicator, and when the information extracted differs from the registration information, the controller causes the display to perform a display indicating that the information extracted is to be corrected.

In this manner, when the result of OCR recognition differs from information in the database, information to be corrected is displayed to the user, thus achieving an image processing apparatus that allows an easier check and correction of information in fax image data than the conventional method.

The image processing apparatus of the present disclosure may be configured such that when the controller causes the display to display the information so that the information is correctable and the operation acceptor receives a correction of the information, the controller reflects the correction of the information in the database via a communicator.

In this manner, when information in the result of OCR recognition is corrected, the correction is reflected in the database, thus achieving an image processing apparatus that allows an easier check and correction of information in fax image data than the conventional method.

The image processing apparatus of the present disclosure may be configured such that when the operation acceptor receives a command to register, in the database, the information extracted from the image data, the controller registers the information in the database via a communicator.

In this manner, when a command to register information in the result of OCR recognition is received, the information is registered in the database, thus achieving an image processing apparatus that allows an easier check and correction of information in fax image data than the conventional method.

The image processing apparatus of the present disclosure may be configured such that the database is stored in an external server, and the controller refers to the database of the server via a communicator.

In this manner, the result of OCR recognition is verified by referring to the database of the external server, thus achieving an image processing apparatus that allows an easier check and correction of information in fax image data than the conventional method.

The present disclosure will be described below in more detail with reference to the accompanying drawings. The following description is illustrative in all respects and should not be construed as limiting the present disclosure.

Embodiment 1

A digital multifunction device 1 which is an embodiment of the image processing apparatus of the present disclosure will be described with reference to FIG. 1.

FIG. 1 is an explanatory diagram showing an example of a configuration of a fax reception system 100 including the digital multifunction device 1 of the present disclosure.

As shown in FIG. 1, in the fax reception system 100 of the present disclosure, the digital multifunction device 1 is connected to a server 2 and a user terminal 6 through a network 3. The digital multifunction device 1 receives fax image data from an external fax device 5 through a telephone network 4.

The digital multifunction device 1 may not necessarily include a fax, and may include any other image data transmitter/receiver capable of transmitting and receiving image data. For example, the digital multifunction device 1 may receive image data from an external device by e-mail, Internet fax, or the like through the Internet.

The digital multifunction device 1 is a device such as an MFP that digitally processes image data and has a copy function, a printer function, a scanner function, a facsimile function, and an e-mail transmission function.

The server 2 is a device that stores a database of transaction information including transaction partner names.

The database includes an address book including the names, addresses, fax numbers, e-mail addresses, and the like of transaction partners.

The database may be stored in the digital multifunction device 1.

The external fax device 5 is a device capable of transmitting fax image data to the digital multifunction device 1 through the telephone network 4.

The user terminal 6 is a terminal that transmits and receives data to and from the digital multifunction device 1 and the server 2 via the network 3.

Instead of the digital multifunction device 1, the user terminal 6 may perform, for example, OCR processing of fax image data received by the digital multifunction device 1 from the external fax device 5, display of the fax image data, the result of OCR processing, and the database, and operation input to the digital multifunction device 1.

Schematic Configuration of Digital Multifunction Device 1

Next, a schematic configuration of the digital multifunction device 1 will be described with reference to FIG. 2.

Figure 2:
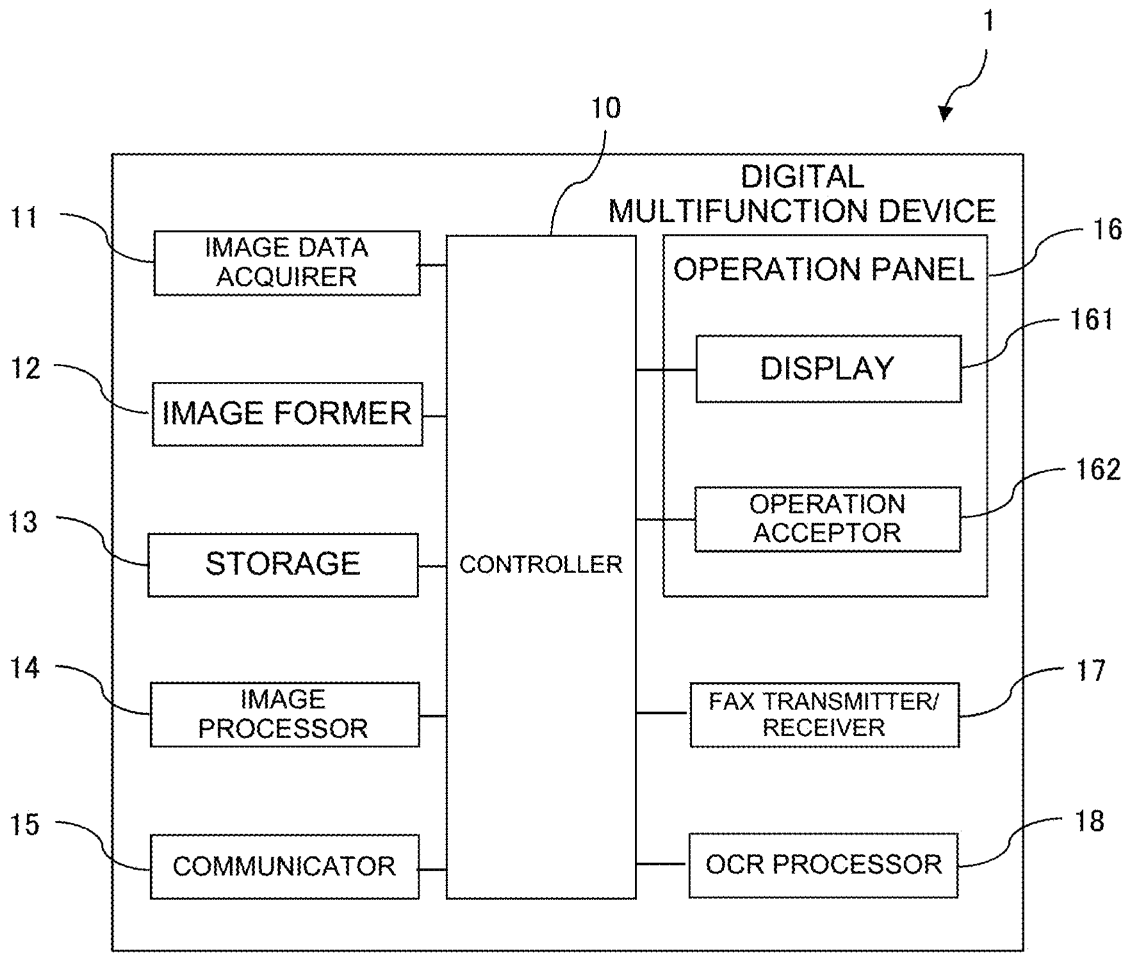
FIG. 2 is a block diagram showing a schematic configuration of the digital multifunction device shown in FIG. 1.

FIG. 2 is a block diagram showing a schematic configuration of the digital multifunction device 1 shown in FIG. 1.

As shown in FIG. 2, the digital multifunction device 1 includes a controller 10, an image data acquirer 11, an image former 12, a storage 13, an image processor 14, a communicator 15, an operation panel 16, a fax transmitter/receiver 17, and an OCR processor 18.

The components of the digital multifunction device 1 will be described below.

The controller 10 integrally controls the digital multifunction device 1, and includes a central processing unit (CPU), a random access memory (RAM), a read only memory (ROM), various interface circuits, and the like.

In order to control the operation of the entire digital multifunction device 1, the controller 10 monitors and controls detection by sensors, and all loads such as a motor, a clutch, and the operation panel 16.

The image data acquirer 11 detects and reads a document placed on a document table or a document transported from a document tray, and generates image data.

The image data acquirer 11 may acquire image data from an external information processing apparatus or the like via the network 3 or acquire image data recorded in a USB or the like, or may acquire image data by combining these methods.

The image former 12 prints out, on paper, image data acquired by the image data acquirer 11 and processed by the image processor 14.

The storage 13 is an element or a storage medium that stores information required to implement various functions of the digital multifunction device 1, a control program, and the like. The storage 13 may be, for example, a semiconductor device such as a RAM or a ROM, or a storage medium such as a hard disk, a flash storage, or a solid state drive (SSD).

The storage 13 stores data required to perform a job, and for example, stores information on a job such as printing, and image data.

A program and data may be held in different devices such that the data is held in a hard disk drive and the program is held in a flash storage.

Based on a command to perform a job such as printing that is input from an operation acceptor 162, the image processor 14 converts image data input from the image data acquirer 11 into an appropriate electrical signal to process the image data so that the image data is suitable for output with enlargement, reduction, or the like.

The communicator 15 communicates with an external device such as the server 2 through the network 3, and transmits and receives data or the like to and from the external device.

The operation panel 16 includes a display panel that includes a liquid crystal panel and the like, and a touch panel that overlaps with the display panel and uses a capacitive method or the like to detect the position of a finger touch. The operation panel 16 includes a display 161 and the operation acceptor 162.

The display 161 displays various types of information.

The display 161 is composed of, for example, a CRT display, a liquid crystal display, an EL display, or the like, and is a display device such as a monitor or a line display for an operating system or application software to display electronic data on a processing state or the like. The controller 10 displays the operation and state of the digital multifunction device 1 using the display 161.

The operation acceptor 162 is an interface used to operate the digital multifunction device 1, and receives a command from the user.

The fax transmitter/receiver 17 transmits and receives fax data to and from the external fax device 5 through the telephone network 4.

The OCR processor 18 performs OCR processing with respect to received fax image data to extract predetermined information included in the fax image data.

Schematic Configuration of Server 2

Next, a schematic configuration of the server 2 will be described with reference to FIG. 3.

Figure 3:
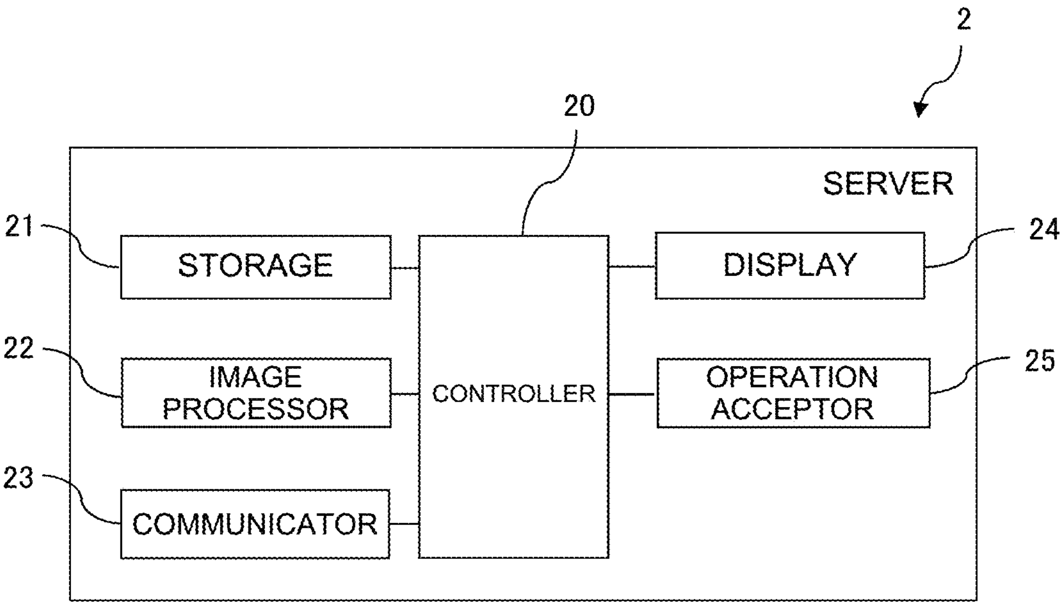
FIG. 3 is a block diagram showing a schematic configuration of a server shown in FIG. 1.

FIG. 3 is a block diagram showing a schematic configuration of the server 2 shown in FIG. 1.

As shown in FIG. 3, the server 2 includes a controller 20, a storage 21, an image processor 22, a communicator 23, a display 24, and an operation acceptor 25.

The components of the server 2 will be described below.

The controller 20 integrally controls the server 2, and includes a CPU, a RAM, a ROM, various interface circuits, and the like.

In order to control the operation of the entire server 2, the controller 20 monitors and controls detection by sensors, and all loads such as the operation acceptor 25.

The storage 21 is an element or a storage medium that stores information required to implement various functions of the server 2, a control program, and the like. The storage 21 may be, for example, a semiconductor device such as a RAM or a ROM, or a storage medium such as a hard disk, a flash storage, or an SSD.

The storage 21 stores a database of transaction information including transaction partner names.

A program and data may be held in different devices such that the data is held in a hard disk drive and the program is held in a flash storage.

The image processor 22 converts image data into an appropriate electrical signal to process the image data so that the image data is suitable for output with enlargement, reduction, or the like.

The communicator 23 communicates with the digital multifunction device 1 via the network 3, and transmits and receives data on transaction information or the like to and from the digital multifunction device 1.

The display 24 displays various types of information on the server 2.

The display 24 is composed of, for example, a CRT display, a liquid crystal display, an EL display, or the like, and is a display device such as a monitor or a line display for an operating system or application software to display electronic data on a processing state or the like.

The controller 20 displays the operation and state of the server 2 using the display 24.

The operation acceptor 25 is an interface used to operate the server 2, and receives a command from the user.

The display 24 and the operation acceptor 25 may include a display panel that includes a liquid crystal panel and the like, and a touch panel that overlaps with the display panel and uses a capacitive method or the like to detect the position of a finger touch.

Process Performed When Fax is Received by Digital Multifunction Device 1 according to Embodiment 1 of the Present Disclosure Next, a process performed when a fax is received by the digital multifunction device 1 according to Embodiment 1 of the present disclosure will be described with reference to FIGS. 4 to 9.

Figure 4:
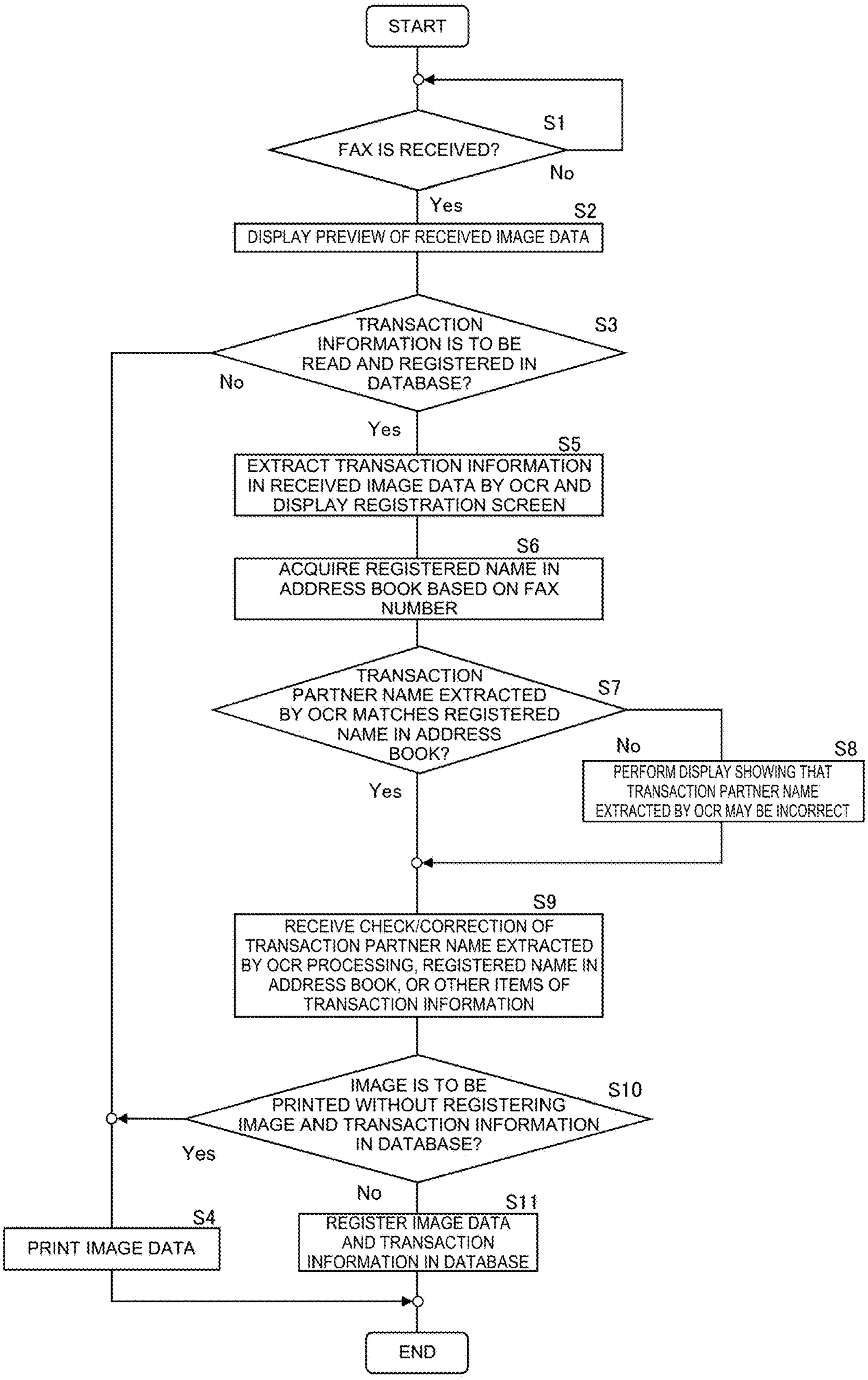
FIG. 4 is a flowchart showing a process performed when a fax is received by the digital multifunction device shown in FIG. 1.

FIG. 4 is a flowchart showing a process performed when a fax is received by the digital multifunction device 1 shown in FIG. 1.

In step S1 shown in FIG. 4, the controller 10 of the digital multifunction device 1 determines whether the fax transmitter/receiver 17 has received a fax (step S1).

When the fax transmitter/receiver 17 has received a fax (when the answer is determined to be Yes in step S1), in step S2, the controller 10 causes the display 161 to display a preview of received fax image data (step S2).

Then, in step S3, the controller 10 determines whether to read transaction information and register the transaction information in the database (step S3).

Figure 5:
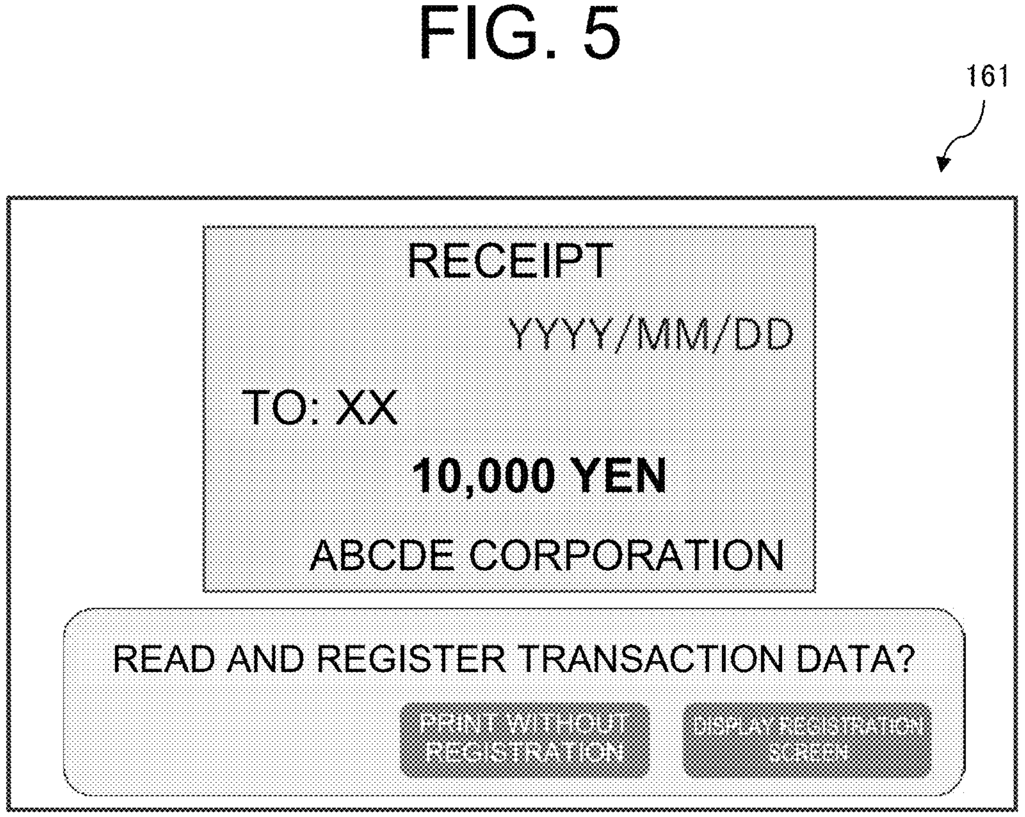
FIG. 5 is an explanatory diagram showing an example of a preview screen of received fax image data that is displayed on a display of the digital multifunction device shown in FIG. 1.

FIG. 5 is an explanatory diagram showing an example of a preview screen of received fax image data that is displayed on the display 161 of the digital multifunction device 1 shown in FIG. 1.

In the example shown in FIG. 5, as a "Receipt", a received fax image including the date "YYYY/MM/DD", the recipient "To: XX", the amount "10,000 yen", and the transaction partner name "ABCDE Corporation" is displayed.

Below the received fax image, the message "Read and register transaction data?" and the buttons "Print without registration" and "Display registration screen" are displayed.

When a normal fax image of an item that is not a receipt is received, the fax image includes no transaction information to be registered; thus, the user touches the button "Print without registration" to print the received fax image.

On the other hand, when a fax image of a receipt is received, the user touches the button "Display registration screen" to read transaction data included in the receipt and display a registration screen.

In step S3 shown in FIG. 4, when the controller 10 determines not to read transaction information or register the transaction information in the database (when the answer is determined to be No in step S3), in step S4, the controller 10 causes the image former 12 to print the received fax image (step S4), and ends the process.

On the other hand, when the controller 10 determines to read transaction information and register the transaction information in the database (when the answer is determined to be Yes in step S3), in step S5, the controller 10 causes the display 161 to display a registration screen that lists transaction information extracted by causing the OCR processor 18 to perform OCR processing directly with respect to the received fax image data developed on a memory of the storage 13 (step S5).

If transaction information is extracted by merely performing OCR processing with respect to received fax image data, the correspondence between character strings obtained by OCR processing and items (amount, transaction partner, etc.) of the transaction information cannot be determined.

Thus, the format of a receipt is defined in advance to determine the correspondence between the items (amount, transaction partner, etc.) and areas in the image in which the respective items are located, and then OCR processing of the areas corresponding to the items is performed by referring to the format to acquire character strings corresponding to the respective items.

Alternatively, a transaction partner may be recognized based on a predetermined character string, and for example, when the character string "Corporation" is extracted, a character string located in the area on the left or right of the character string "Corporation" may be recognized as a transaction partner.

Thus, received fax image data is directly subjected to OCR processing, not requiring scanning of a fax image printed on paper, unlike the conventional method.

Furthermore, OCR erroneous recognition is less likely to occur as compared with the case where image data obtained by scanning fax image printed on paper is subjected to OCR processing.

Figure 6A:
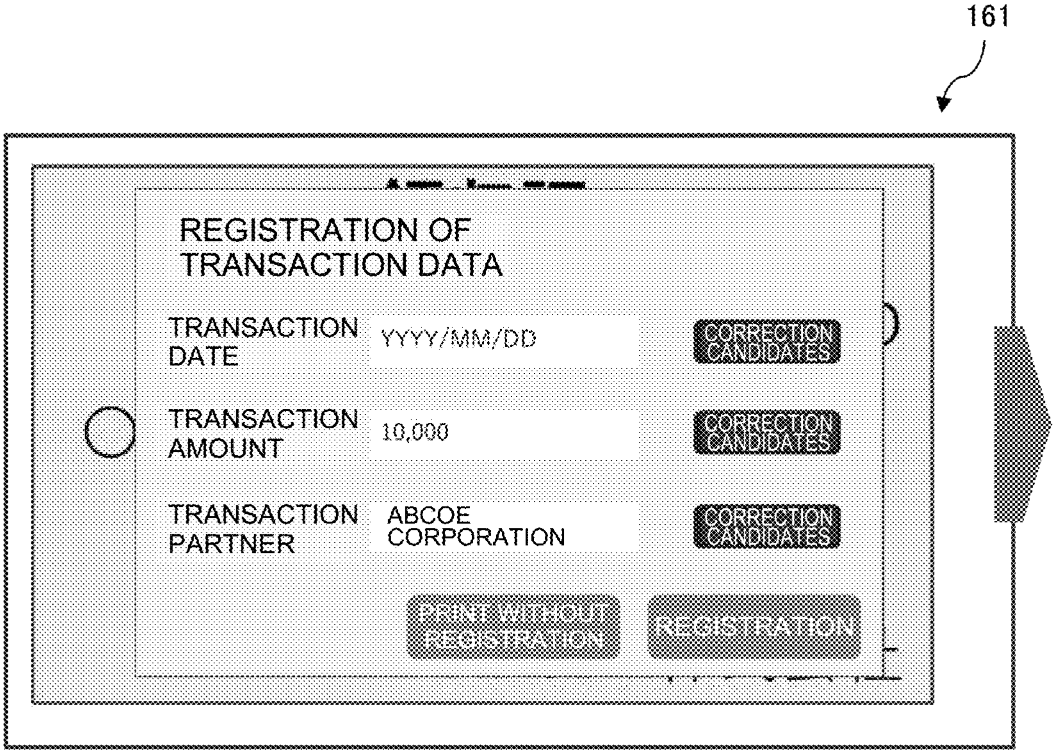
FIGS. 6A and 6B are explanatory diagrams showing an example of a registration screen for transaction information in received fax image data that is displayed on the display of the digital multifunction device shown in FIG. 1.
Figure 6B:
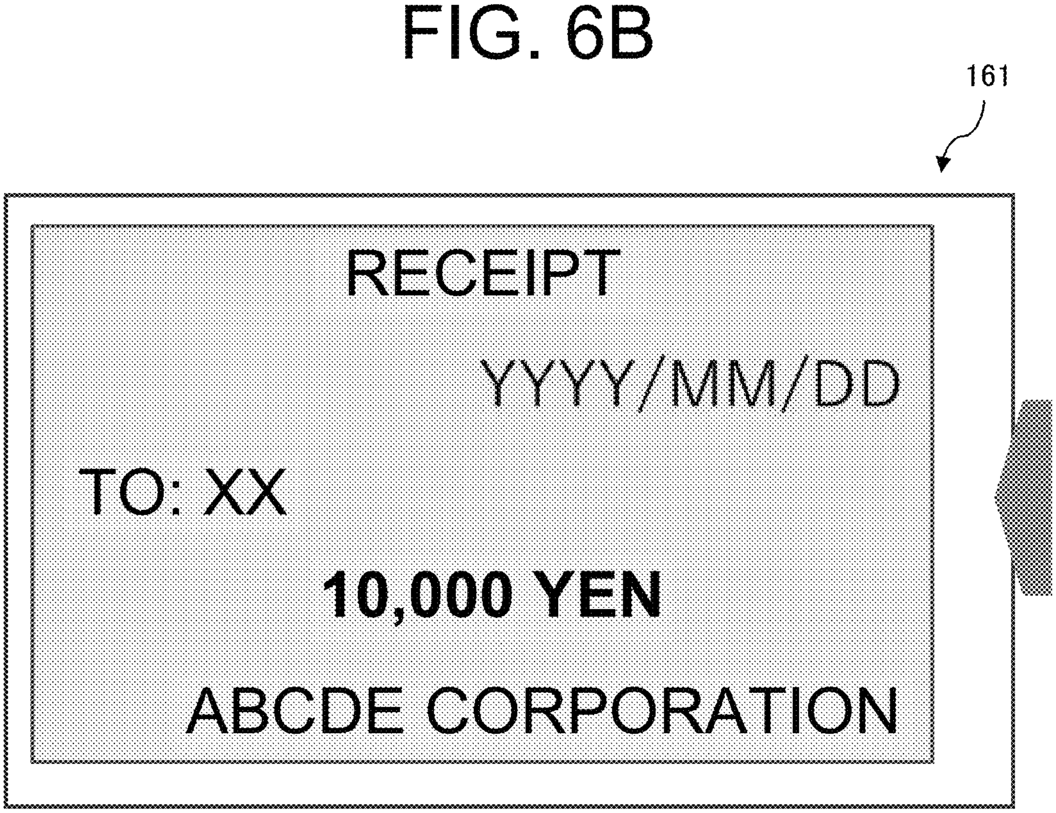

FIGS. 6A and 6B are explanatory diagrams showing an example of a registration screen for transaction information in received fax image data that is displayed on the display 161 of the digital multifunction device 1 shown in FIG. 1.

FIG. 6A shows a registration screen for transaction information, and FIG. 6B shows a preview screen of received fax image data.

As shown in FIG. 6A, the display 161 displays a registration screen that lists transaction information extracted by causing the OCR processor 18 to perform OCR processing with respect to received fax image data.

In the example shown in FIG. 6A, as items for "Registration of transaction data", "Transaction date: YYYY/MM/DD", "Transaction amount: 10,000", and "Transaction partner: ABCDE Corporation" are displayed.

When the user touches the button "Correction candidates" beside each of the items, correction candidates proposed based on the database are displayed.

When a registration screen is displayed on a preview screen as shown in FIG. 6A, the display 161 can switch between displaying and hiding the registration screen, allowing the user to touch a tab on the right edge of the screen to view the preview screen behind the registration screen.

When the user touches the tab on the right edge of the screen shown in FIG. 6A, the screen shown in FIG. 6B is displayed.

The preview screen and the registration screen may be simultaneously displayed next to each other.

When the user touches the button "Print without registration" on the screen shown in FIG. 6A, no registration process is performed, and the received fax image is printed.

On the other hand, when the user touches the button "Registration" on the screen shown in FIG. 6A, the received fax image and transaction information displayed are registered in the database of the server 2.

Then, in step S6 shown in FIG. 4, the controller 10 refers to the address book in the database of the server 2 via the communicator 15 to acquire a registered name of the transaction partner based on the fax number from which the fax image is transmitted (step S6).

Then, in step S7, the controller 10 determines whether the transaction partner name obtained by OCR recognition matches the registered name in the database (step S7).

When the transaction partner name obtained by OCR recognition does not match the registered name in the database (when the answer is determined to be No in step S7), in step S8, the controller 10 causes the display 161 to perform a display indicating that the transaction partner name obtained by OCR recognition may be incorrect (step S8). Then, the controller 10 performs the process in step S9.

Figure 7:
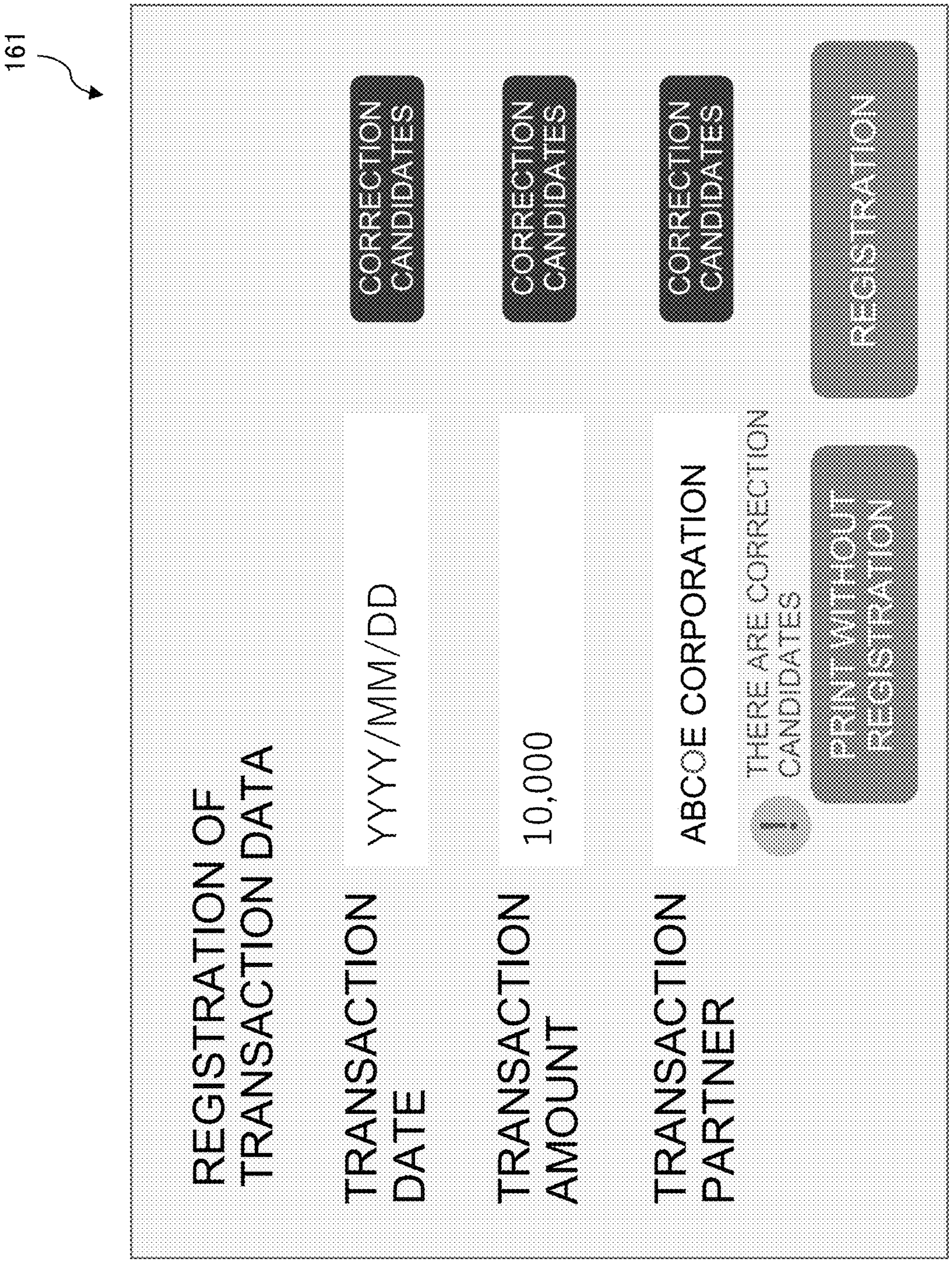
FIG. 7 is an explanatory diagram showing an example of a screen displayed when the transaction information in the received fax image data that is displayed on the display of the digital multifunction device shown in FIG. 1 is to be corrected.

FIG. 7 is an explanatory diagram showing an example of a screen displayed when the transaction information in the received fax image data that is displayed on the display 161 of the digital multifunction device 1 shown in FIG. 1 needs to be corrected.

The example in FIG. 7 shows the case where the transaction partner name "ABCOE Corporation" in the result of OCR recognition does not match the registered name "ABCDE Corporation" in the address book that is based on the fax number.

In this case, the portion "O" of the transaction partner name "ABCOE Corporation" that does not match the registered name "ABCDE Corporation" in the address book is displayed in bold red text, and below the transaction partner name, the message "! There are correction candidates" is displayed in red text to attract the attention of the user.

When the user touches the button "Correction candidates" beside the transaction partner name, a list of correction candidates is displayed.

The user can select an appropriate correction candidate or directly enter the correct transaction partner name in the transaction partner name field to correct the transaction partner name.

The user can correct other items of the transaction information in the same manner.

The transaction partner name obtained by OCR recognition performed when a fax is received may be correct, for example, due to a change in the transaction partner name.

Thus, when the result of OCR recognition is correct, the user can touch the registration button without correcting the transaction partner name, to register, in the database, the transaction partner name obtained by OCR recognition as a new transaction partner name.

FIGS. 8A to 8D are explanatory diagrams showing various examples of the screen displayed when the transaction information in the received fax image data that is displayed on the display 161 of the digital multifunction device 1 shown in FIG. 1 is to be corrected.

Figure 8A:
FIGS. 8A to 8D are explanatory diagrams showing various examples of the screen displayed when the transaction information in the received fax image data that is displayed on the display of the digital multifunction device shown in FIG. 1 is to be corrected.

In the example shown in FIG. 8A, the portion "O" of the transaction partner name "ABCOE Corporation" that does not match the registered name "ABCDE Corporation" in the address book is displayed in bold red text.

Figure 8B:

In the example shown in FIG. 8B, the portion "O" of the transaction partner name "ABCOE Corporation" that does not match the registered name "ABCDE Corporation" in the address book is underlined in red.

Figure 8C:
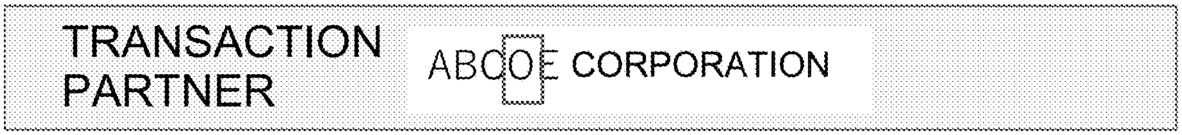

In the example shown in FIG. 8C, the portion "O" of the transaction partner name "ABCOE Corporation" that does not match the registered name "ABCDE Corporation" in the address book is surrounded by a red rectangle.

Figure 8D:
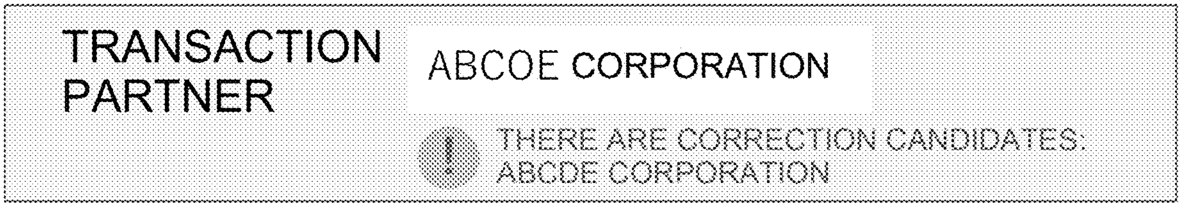

In the example shown in FIG. 8D, the message "! There are correction candidates: ABCDE Corporation" is displayed, and the registered name "ABCDE Corporation" in the address book is displayed in red text.

The display methods shown in FIGS. 8A to 8D may be combined, or other display methods may be used.

In step S7 shown in FIG. 4, when the transaction partner name obtained by OCR recognition matches the registered name in the database (when the answer is determined to be Yes in step S7), in step S9, the controller 10 receives a check or correction of the transaction partner name obtained by OCR recognition, the registered name in the address book, or other items of the transaction information (step S9).

Then, in step S10, the controller 10 determines whether to print the received fax image without registering the received fax image and the transaction information in the database (step S10).

When the controller 10 determines to print the received fax image without registering the received fax image and the transaction information in the database (when the answer is determined to be Yes in step S10), in step S4, the controller 10 causes the image former 12 to print the received fax image (step S4), and ends the process.

On the other hand, when the controller 10 determines to register the received fax image and the transaction information in the database (when the answer is determined to be No in step S10), in step S11, the controller 10 registers the received fax image and the transaction information in the database via the communicator 15 (step S11), and ends the process.

Figure 9:
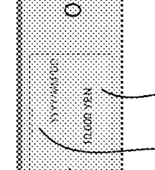
FIG. 9 is a table showing an example of a structure of a database stored in the server shown in FIG. 1.

FIG. 9 is a table showing an example of a structure of the database registered in the server 2 shown in FIG. 1.

As shown in FIG. 9, for a single piece of transaction information, a record ID "1, etc." is assigned, and transaction information (transaction date "YYYY/MM/DD", transaction amount "10,000", transaction partner "ABCDE Corporation"), and image data or an image file path are registered.

In this manner, a preview of received fax image data is displayed to display information extracted by OCR processing, thus achieving the digital multifunction device 1 that allows an easier check and correction of information in the fax image data than the conventional method.

Embodiment 2

Next, a process performed when a fax is received by the digital multifunction device 1 according to Embodiment 2 of the present disclosure will be described with reference to FIG. 10.

Embodiment 1 describes an example in which the controller 10 refers to the address book in the database of the server 2 to determine whether the transaction partner name obtained by OCR recognition matches the registered name in the database and when the transaction partner name is incorrect, the controller 10 receives a check or correction of the transaction information.

On the other hand, Embodiment 2 describes a process performed when no corresponding registered name is acquired from the address book in the database of the server 2.

A schematic configuration of the fax reception system 100 according to Embodiment 2 is the same as that of the fax reception system 100 according to Embodiment 1 (FIGS. 1 to 3), and thus is omitted from the description.

Figure 10:
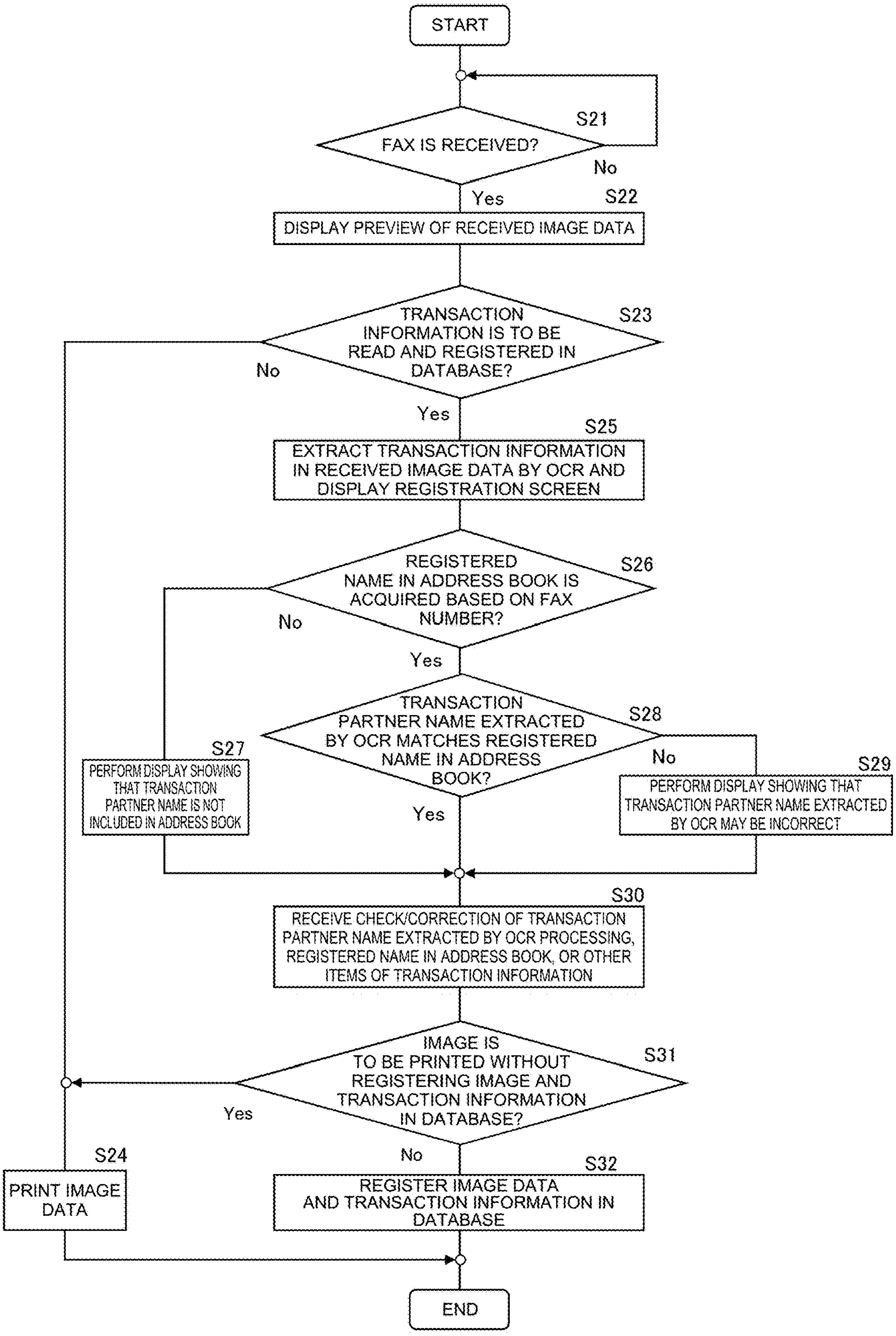
FIG. 10 is a flowchart showing a process performed when a fax is received by a digital multifunction device according to Embodiment 2 of the present disclosure.

Process Performed When Fax is Received by Digital Multifunction Device 1 according to Embodiment 2 of the Present Disclosure FIG. 10 is a flowchart showing a process performed when a fax is received by the digital multifunction device 1 according to Embodiment 2 of the present disclosure.

The processes in steps S21 to S25 and S28 to S32 shown in FIG. 10 respectively correspond to the processes in steps S1 to S5 and S7 to S11 shown in FIG. 4 (Embodiment 1), and thus are omitted from the description.

The processes in step S26 and S27 shown in FIG. 10 that are not shown in FIG. 4 will be described here.

In step S25 shown in FIG. 10, the controller 10 causes the display 161 to display a registration screen that lists transaction information extracted by causing the OCR processor 18 to perform OCR processing with respect to the received fax image data (step S25). Then, in step S26, the controller 10 refers to the address book in the database of the server 2 via the communicator 15 to determine whether a registered name of the transaction partner is acquired based on the fax number from which the fax image is transmitted (step S26).

When the controller 10 determines that a registered name of the transaction partner is acquired based on the fax number (when the answer is determined to be Yes in step S26), in step S28, the controller 10 determines whether the transaction partner name obtained by OCR recognition matches the registered name in the database (step S28).

On the other hand, when the controller 10 determines that no registered name of the transaction partner is acquired based on the fax number (when the answer is determined to be No in step S26), in step S27, the controller 10 causes the display 161 to perform a display indicating that the transaction partner name is not included in the address book (step S27).

Then, in step S30, the controller 10 receives a check or correction of the transaction partner name obtained by OCR recognition, the registered name in the address book, or other items of the transaction information (step S30).

In this manner, when no corresponding registered name is acquired from the address book in the database of the server 2, the controller 10 causes the display 161 to perform a display indicating that the transaction partner name is not included in the address book, and receives a check or correction, thus achieving the digital multifunction device 1 that allows an easier check and correction of information in fax image data than the conventional method.

Preferred embodiments of the present disclosure include combinations of any of the embodiments described above.

The present disclosure may have various modifications in addition to the embodiments described above. Such modifications should not be construed as falling outside the scope of the present disclosure. The present disclosure should include the claims and their equivalents, and all modifications within the scope of the claims.

What is claimed is:

1. An image processing apparatus comprising:

an optical character reader (OCR) processor that performs OCR processing with respect to FAX image data;

a display that displays various data to a user; and a controller that has at least one central processing unit (CPU), the controller controlling the OCR processor and the display, wherein the controller:

upon receiving the FAX image data and a command to extract predetermined information from the FAX image data, causes the OCR processor to perform the OCR processing with respect to the FAX image data to extract the predetermined information, and causes the display to display the predetermined information extracted by the OCR processing, obtains a transmission source FAX number from the FAX image data, obtains, from an address book in a database, a registered transaction partner name corresponding to the transmission source FAX number, compares a transaction partner name extracted from the FAX image data against the registered transaction partner name, and when the extracted transaction partner name is different from the registered transaction partner name, causes the display to emphatically display the difference, and in response to receiving a command from the user, causes the display to display correction candidates obtained from the database.

2. The image processing apparatus according to claim 1, wherein the controller further:

causes the display to display the extracted transaction partner name so that the user is able to correct the registered transaction partner name receives, from the user, a correction of the registered transaction partner name, and updates, based on the correction, the registered transaction partner name in the database.

3. An image forming apparatus comprising:

the image processing apparatus according to claim 2; and an image former that forms an image based on the FAX image data, wherein when the controller receives a command to print the predetermined information without registering the predetermined information in the database, the controller causes the image former to form the image based on the FAX image data without extracting the predetermined information and performing registration processing in the database.

4. The image processing apparatus according to claim 1, wherein when the controller receives a command to register, in the database, the predetermined information extracted from the FAX image data, the controller registers the predetermined information in the database.

5. An image forming apparatus comprising:

the image processing apparatus according to claim 4; and an image former that forms an image based on the FAX image data, wherein when the controller receives a command to print the predetermined information without registering the predetermined information in the database, the controller causes the image former to form the image based on the FAX image data without extracting the predetermined information and performing registration processing in the database.

6. The image processing apparatus according to claim 1, wherein:

the database is stored in a storage in the image processing apparatus.

7. An image forming apparatus comprising:

the image processing apparatus according to claim 6; and an image former that forms an image based on the FAX image data, wherein when the controller receives a command to print the predetermined information without registering the predetermined information in the database, the controller causes the image former to form the image based on the FAX image data without extracting the predetermined information and performing registration processing in the database.

8. An image forming apparatus comprising:

the image processing apparatus according to claim 1; and an image former that forms an image based on the FAX image data, wherein when the controller receives a command to print the predetermined information without registering the predetermined information in the database, the controller causes the image former to form the image based on the FAX image data without extracting the predetermined information and performing registration processing in the database.

9. An image processing method performed by an image processing apparatus, the image processing method comprising:

upon receiving FAX image data and a command to extract predetermined information from the FAX image data, performing OCR processing with respect to the FAX image data to extract the predetermined information, and displaying the predetermined information extracted by the OCR processing;

obtaining a transmission source FAX number from the FAX image data;

obtaining, from an address book in a database, a registered transaction partner name corresponding to the transmission source FAX number;

comparing a transaction partner name extracted from the FAX image data against the registered transaction partner name;

when the extracted transaction partner name is different from the registered transaction partner name, emphatically displaying the difference; and in response to receiving a command from a user, displaying correction candidates obtained from the database.

* * * * *